United States Patent [19]
Neat et al.

[11] Patent Number: 5,464,708
[45] Date of Patent: Nov. 7, 1995

[54] TITANIUM DIOXIDE-BASED MATERIAL

[75] Inventors: Robin J. Neat, Milton; William J. Macklin, Oxford, both of United Kingdom

[73] Assignee: United Kingdom Atomic Energy Authority, Didcot, England

[21] Appl. No.: 199,173

[22] PCT Filed: Sep. 29, 1992

[86] PCT No.: PCT/GB92/01787

§ 371 Date: Feb. 25, 1994

§ 102(e) Date: Feb. 25, 1994

[87] PCT Pub. No.: WO93/08612

PCT Pub. Date: Apr. 29, 1993

[30] Foreign Application Priority Data

Oct. 16, 1991 [GB] United Kingdom ............. 9121912

[51] Int. Cl.[6] .................. H01M 4/04; H01M 4/48
[52] U.S. Cl. .................................. 429/218; 205/59
[58] Field of Search .......................... 429/218; 205/59

[56] References Cited

U.S. PATENT DOCUMENTS

| | | | |
|---|---|---|---|
| 4,009,052 | 2/1977 | Whittingham | 429/191 |
| 4,357,215 | 11/1982 | Goodenough et al. | 205/59 |
| 5,023,153 | 6/1991 | Weppner | 429/40 |
| 5,147,739 | 9/1992 | Beard | 429/218 |
| 5,284,721 | 2/1994 | Beard | 429/194 |

OTHER PUBLICATIONS

J. E. Bauerle, "Study of Solid Electrolyte Polarization by a Complex Admittance Method", J. Phys. Chem Solids, vol. 30, pp. 2657–2670 1969.

Kanamura et al. "Diffusion of Lithium in the $TiO_2$ cathode of a Lithium Battery" J. Power Sources, vol. 20, 1987 pp. 127–134.

Ohzuku et al. "Electrochemistry of Anatase titanium dioxide in lithium nonaqueous cells", J. Power Sources, vol. 14 1985 pp. 153–166.

"Lithium Insertion in Different $TiO_2$ Modifications," B. Zachau–Christiansen et al, Solid State Ionics, 28–30 (1988), pp. 1176–1182.

"A Simple One–Electron MO Model for the Intercalation of Lithium in $TiO_2$ and $MnO_2$," M. Voinov, Procs. Electrochem. Soc. 1981, vol. 81, Part 4.

"Cathodic Reactions of Various Metallic Oxides in Nonaqueous Electrolytes Containing Lithium Ions," S. Yoshizawa et al, 32nd ISE Metting, Dubrovnik (1981), pp. 864–867. month not available.

"Nonaqueous Lithium/Titanium Dioxide Cell," T. Ohzuku et al, Electrochimica ACTA. (1979), vol. 24, pp. 219–222.

*Primary Examiner*—Stephen Kalafut
*Assistant Examiner*—Carol Chaney
*Attorney, Agent, or Firm*—William R. Hinds

[57] ABSTRACT

Electrochemical insertion of lithium into titanium dioxide initially in its rutile form, the insertion being performed at an elevated temperature (for example 120° C.), produces a material $Li_xTiO_2$ with x between 0.5 and 1.0. This material is suitable as an active cathode material in a secondary cell as it can be repeatedly recycled. The material has a crystal struture, different from that of the initial rutile titania, which is believed to be hexagonal.

4 Claims, 3 Drawing Sheets

TITANIUM DIOXIDE-BASED MATERIAL

This invention relates to a method of making a reversible electrochemical cell incorporating a material based on titanium dioxide, and to use of this material in an electrochemical cell.

Titanium dioxide occurs in two forms: anatase and rutile. It has hitherto been found that lithium can be inserted into these two forms to very different extents. The chemical lithiation of anatase titania with n-butyl lithium results in a maximum stoichiometry of $Li_{0.7}TiO_2$ (see M. S. Whittingham et al., J. Electrochem. Soc., 124, 1388 (1977)), whereas it has been reported that only small amounts of lithium, no more than 2 atomic percent, can be chemically inserted into the rutile form (see D. W. Murphy et al., Solid State Ionics, 9 & 10, 413 (1983)). The lithiated anatase material $Li_xTiO_2$ has been cycled in an electrochemical cell over the range of x from 0.15 to 0.45 using a lithium perchlorate/propylene carbonate electrolyte, with an average cell voltage of about 1.7 V (see F. Bonino et al., J. Power Sources, 6, 261 (1981)), whereas rutile titania in such a cell was found to have poor capacity and to have a significantly lower discharge voltage.

According to the present invention there is provided a method of making a rechargeable electrochemical cell with a cathode containing as the active material a material of stoichiometric formula $Li_xTiO_2$, wherein x is above 0.5 but is no higher than 1.0, and the method comprises the successive steps of: (i) assembling an electrochemical cell having an anode comprising metallic lithium as active material; a non-aqueous lithium ion conducting electrolyte; and a cathode containing titanium dioxide in its rutile form as active cathode material; and (ii) discharging the cell at an elevated temperature between 100° C. and 150° C. such that the cathode material is transformed into material of formula $Li_xTiO_2$.

Preferably the elevated temperature is about 120° C. Preferably the electrolyte comprises a complex of poly(ethylene oxide) and a lithium salt such as $LiCF_3SO_3$ or $LiClO_4$, this providing a solid-state electrolyte.

In a second aspect, the invention provides a reversible electrochemical cell incorporating, as an active electrode material, a material of stoichiometric formula $Li_xTiO_2$, where x is above 0.5 but is no higher than 1.0, the material having an X-ray diffraction pattern using copper K-alpha radiation as shown in FIG. 4(d).

The invention will now be further described with reference to the accompanying drawings, in which.

Experiments have been carried out using the two different forms of titanium dioxide, anatase and rutile. Composite cathodes containing titanium dioxide sample, ketjen carbon black, poly(ethylene oxide)(PEO) (MW 4000000) and $LiClO_4$ were prepared by doctor blade casting from the appropriate solvent slurry onto a nickel current collector. The resulting cathodes had the composition 45 vol. % titanium dioxide, 5 vol. % carbon and 50 vol. % PEO-$LiClO_4$ ([EO units]/[Li]=12) with a capacity of about 1 mA h cm$^{-2}$ based on a value of 335 mA h g$^{-1}$, (corresponding to the insertion of one lithium into $TiO_2$). Sheets of the electrolyte PEO-$LiClO_4$ ([EO units]/[Li]=12) were cast from acetonitrile solution onto silicone release paper. Solid state cells containing a lithium foil anode with an active area of 40 cm$^2$ were constructed in a dry room (T=20° C., dewpoint temperature −30° C.) and assembled using a combination of heat and pressure, each cell consisting of a nickel foil current collector, a composite cathode layer about 36 microns thick, a polymer electrolyte layer about 85 microns thick, and a lithium foil 100 microns thick. The cells were packaged and placed in an oven at 120° C. for testing.

The cells were then discharged, and cycled using a computer-controlled charge/discharge apparatus in a constant current mode between preset voltage limits, all at a constant temperature of 120° C. Initial cell cycling was carried out between the voltage limits 3.0 V and 1.2 V at the C/8 rate (i.e. at such a rate as to discharge it completely after 8 hours if it were 100% efficient).

Figure 1:
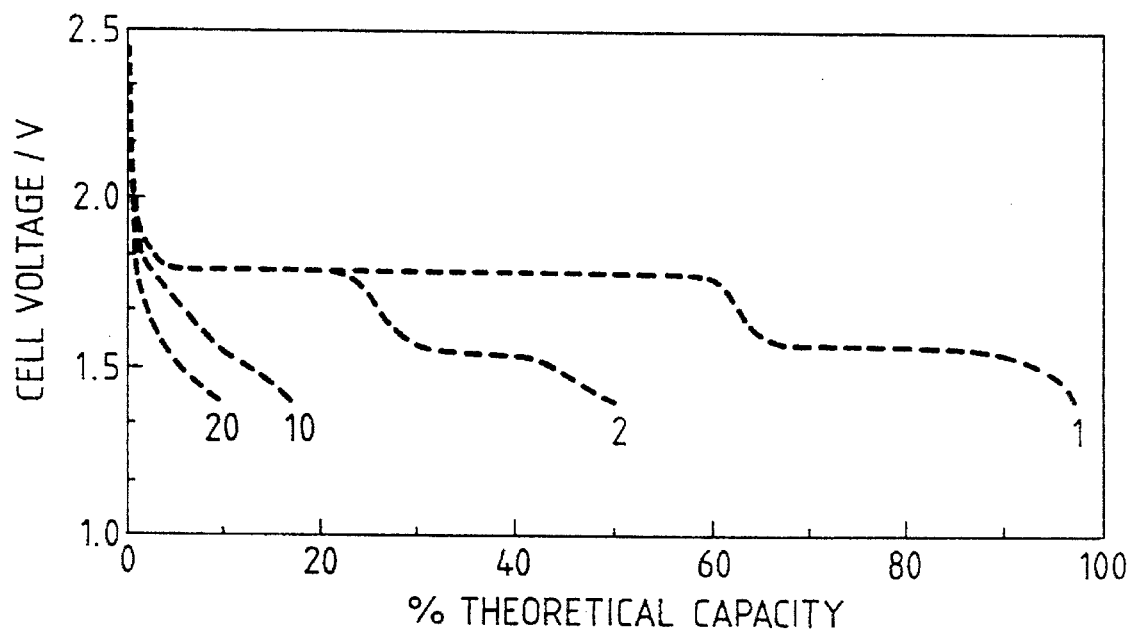
FIG. 1 shows discharge graphs for electrochemical cells incorporating anatase titanium dioxide.

Referring to FIG. 1 there are shown graphically the 1st, 2nd, 10th and 20th discharge curves for the anatase cells. The primary discharge of anatase results in two distinct plateaux. The first at 1.78 V continues up to the composition $Li_{0.6}TiO_2$; the final composition is $Li_{1.0}TiO_2$, corresponding to a theoretical energy density of about 565 W h kg$^{-1}$. The shape of the second discharge curve resembles that of the first, albeit at a lower capacity, implying that the anatase structure is retained following the initial insertion of lithium ions. This has been confirmed by X-ray diffraction where the pattern obtained from an anatase cathode taken from a cell discharged to a depth $Li_{0.7}TiO_2$ is essentially the same as that obtained from an uncycled cathode. The cause of the poor capacity retention in the anatase material that occurs during cycling has not been established.

Figure 2:
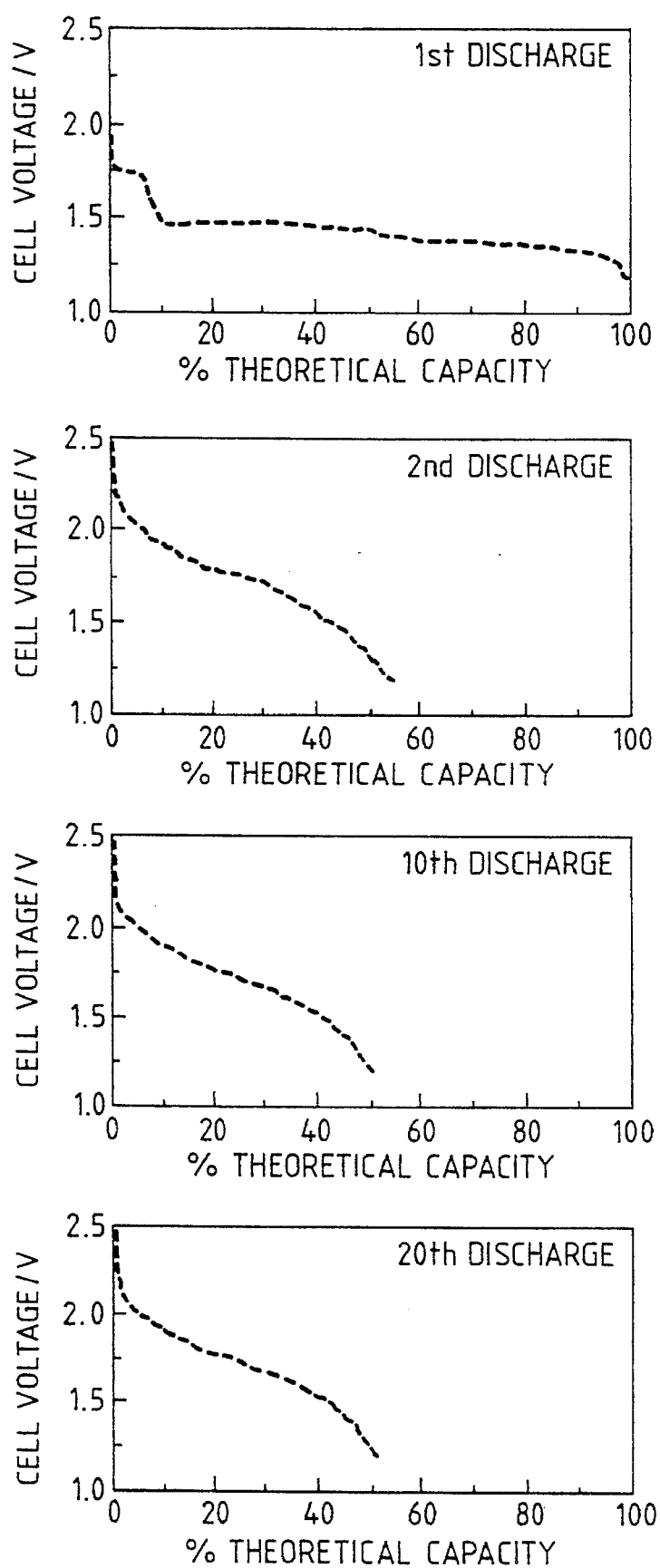
FIG. 2 shows discharge graphs for electrochemical cells incorporating rutile titanium dioxide.

Referring now to FIG. 2 there are shown graphically the 1st, 2nd, 10th and 20th discharge curves for the rutile cells. The initial discharge has a short step at about 1.75 V that can be attributed to a small quantity of anatase impurity in the rutile sample, with the majority of the discharge capacity (about 90%) occurring between 1.50 and 1.40 V. Complete discharge to a 1.2 V cutoff gives a final composition $Li_{1.0}TiO_2$ corresponding to a theoretical energy density of about 500 W h kg$^{-1}$. (The insertion of one lithium per titanium into $TiO_2$ rutile in this lithium polymer electrolyte cell is in complete contrast to the very low levels of lithium successfully incorporated into rutile titanium dioxide at ambient temperature). The second discharge shows a cell voltage that decreases continuously with capacity to a value approximately half that obtained in the initial discharge ( i.e. cycling of $Li_xTiO_2$ where x varies between 0.5 and 1.0). The average cell voltage of 1.73 V correspnds to a theoretical energy density of about 290 W h kg$^{-1}$. The subsequent discharge curves are all very similar both in terms of shape and capacity.

Figure 3:
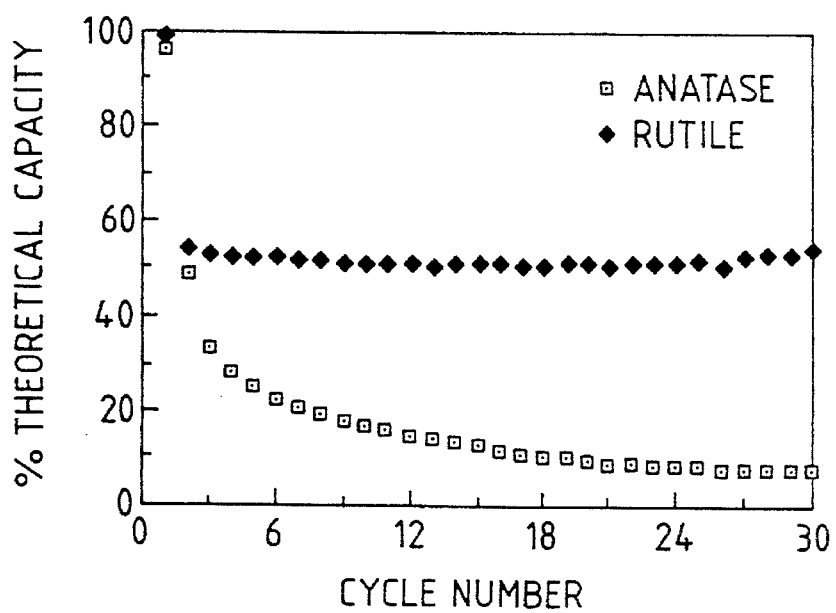
FIG. 3 shows graphically the variation in capacity with discharge cycle for the cells of FIG. 1 and of FIG. 2.

Referring now to FIG. 3, the variation in the capacity of the two types of cell with cycle number is shown graphically for the first thirty cycles. It is apparent that the lithiated rutile material has excellent reversibility. Indeed the rutile cells have been found to suffer very little decrease in capacity after as many as 250 cycles, even at a C or C/2 discharge rate.

Figure 4:
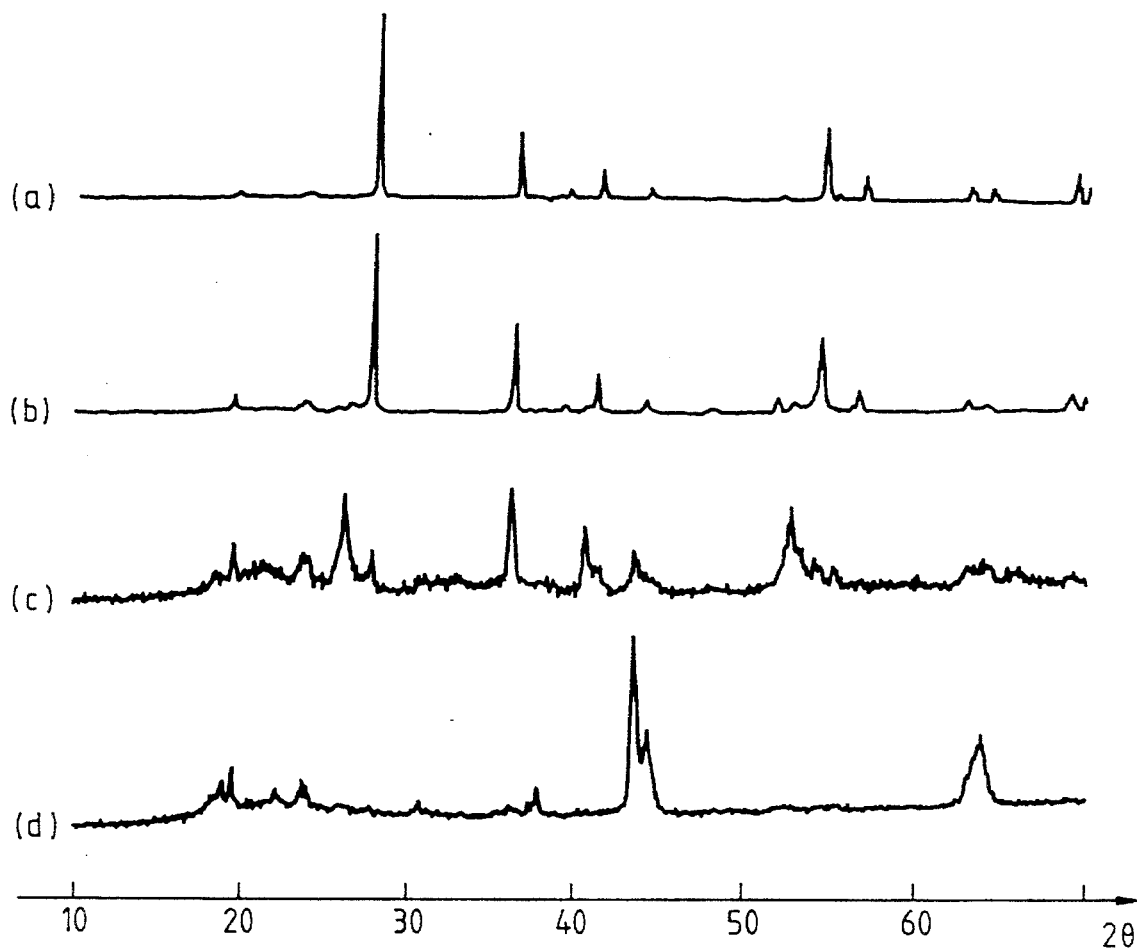
FIG. 4 shows graphically X-ray diffraction patterns at successive stages during the first discharge of a cell incorporating rutile titanium dioxide.

Referring now to FIG. 4, X-ray diffraction patterns have been obtained for composite cathodes removed from cells made with rutile titanium dioxide discharged to different depths. These patterns were obtained with a diffractometer employing copper K-alpha radiation and incorporating pulse height discrimination and a curved graphite secondary monochromator, data collection and processing over the range for 2θ from 10 to 70 degrees being computer controlled. FIG. 4(a) shows the pattern from undischarged rutile $TiO_2$. FIG. 4(b) shows the pattern from a composite cathode discharged to the composition $Li_{0.25}TiO_2$, where the rutile structure is clearly intact. (The peaks appearing at 2θ values of 19.0° and 23.5° are associated with the crystalline polymer). At 50% depth of discharge, FIG. 4 (c), that is at a composition of $Li_{0.5}TiO_2$, there is a drastic reduction in the intensity of the strongest rutile reflection at 27.5° with the predominant phase being an unidentified lithium titanium oxide characterised by the d-spacings given in Table 1. (The composite nature of the cathode samples limits the quality of the X-ray diffraction data and so only major reflections are given). At a composition $Li_{0.8}TiO_2$, FIG. 4 (d), the majority phase has a X-ray diffraction pattern similar to that of a hexagonal form of $LiTiO_2$ first reported by Hewston and Chamberland (see J.Phys. Chem. Solids, Vol. 48, No. 2, 97 (1987)), while the peaks associated with the unidentified phase seen at composition $Li_{0.5}TiO_2$ have disappeared. The intercalation of lithium into $TiO_2$ rutile appears to occur via an intermediate phase of approximate composition $Li_{0.5}TiO_2$ that on further lithiation leads to the formation of a hexagonal form of $LiTiO_2$. Presumably the activation barrier to the formation of the intermediate phase precludes its formation at ambient temperature.

TABLE 1

X-ray Diffraction Data for $Li_{0.5}TiO_2$

| Intensity | Interplanar spacing/nm |
|---|---|
| 95 | .344 |
| 100 | .249 |
| 65 | .222 |
| 80 | .174 |

A significant decrease in cell resistance, from about 5 ohms to about 1 ohm, is observed during the first discharge of the $TiO_2$ rutile cells in the region up to a composition about $Li_{0.5}TiO_2$, while during subsequent cycling the cell resistance is essentially independent of the state of discharge. This is consistent with the initial resistance drop being associated with a structural transformation of the $TiO_2$ rutile such as that described above resulting in a material of higher conductivity. A similar decrease in cell resistance is not observed during the first discharge of the anatase $TiO_2$ cells.

It is thus apparent that one mole of lithium can be electrochemically intercalated into both anatase and rutile polymorphs of $TiO_2$ in a lithium polymer electrolyte cell operating at 120° C. On cycling the anatase form demonstrates poor capacity retention. During the initial discharge the rutile material undergoes a structural transformation resulting in the formation of a hexagonal form of $LiTiO_2$. This hexagonal $LiTiO_2$ prepared in situ from rutile exhibits excellent reversibility over the composition range $Li_xTiO_2$, where x is between 0.5 and 1.0, and good rate performance. The average cell voltage is about 1.73 V and corresponds to a theoretical energy density of about 290 W h $kg^{-1}$.

We claim:

1. A method of making a rechargeable electrochemical cell with a cathode containing as the active material a material of stoichiometric formula $Li_xTiO_2$, characterised in that x is above 0.5 but is no higher than 1.0, and that the method comprises the successive steps of:

(i) assembling an electrochemical cell having an anode comprising metallic lithium as active material; a non-aqueous lithium ion conducting electrolyte; and a cathode containing titanium dioxide in its rutile form as active cathode material; and (ii) discharging the cell at an elevated temperature between 100° C. and 150° C. such that the cathode material is transformed into material of formula $Li_xTiO_2$.

2. A method as claimed in claim 1 wherein the elevated temperature is about 120° C.

3. A method as claimed in claim 1 wherein the electrolyte is a solid state electrolyte.

4. A reversible electromechanical cell incorporation, as an active electrode material, a material of stoichiometric formula $Li_xTiO_2$, where x is above 0.5 but is no higher than 1.0, the material having an X-ray diffraction pattern using copper K-alpha radiation including lines as follows:

| 2θ | relative intensity |
|---|---|
| 38 | 15 |
| 43.7 | 100 |
| 44.2 | 46 |
| 63.8 | 37 |

* * * * *